United States Patent [19]

Sakai

[11] Patent Number: 4,818,131
[45] Date of Patent: Apr. 4, 1989

[54] TYPEWRITER HAVING MEANS FOR AUTOMATIC INDICATION OF CANDIDATE CORRECT WORD FOR MISSPELLED WORD, AND/OR AUTOMATIC CORRECTION OF MISSPELLED WORD

[75] Inventor: Toshiyuki Sakai, Nagoya, Japan

[73] Assignee: Brother Kogyo Kabushiki Kaisha, Japan

[21] Appl. No.: 947,828

[22] Filed: Dec. 29, 1986

[30] Foreign Application Priority Data

Dec. 29, 1985 [JP] Japan .............................. 60-298528
Dec. 29, 1985 [JP] Japan .............................. 60-298529

[51] Int. Cl.⁴ .............................. B41J 3/46; B41J 3/50
[52] U.S. Cl. ..................................... 400/63; 400/74; 400/697.1
[58] Field of Search ................. 400/63, 74, 697, 697.1

[56] References Cited

U.S. PATENT DOCUMENTS 4,136,395  1/1979  Kolpek et al. ........................ 400/63
4,655,620  4/1987  Adams et al. .................... 400/697.1
4,671,684  6/1987  Kojima ................................ 400/63

OTHER PUBLICATIONS

Barker et al, "Method for Detecting...," IBM Technical Disclosure Bulletin, vol. 25, No. 8, p. 4225, 1/83.
Hernandez et al, "Interactive Spelling Correction..."
IBM Technical Disclosure Bulletin, vol. 25, No. 8, pp. 4227-4228, 1/83.
Hackett, "Spelling Correcting Typewriter" IBM Technical Disclosure Bulletin, vol. 18, No. 2, pp. 530-531, 7/75.
Adam et al, "Spelling Processing Functions..." IBM Technical Disclosure Bulletin, vol. 24, No. 10, pp. 5003-5008, 3/82.

Primary Examiner—William Pieprz
Attorney, Agent, or Firm—Parkhurst, Oliff & Berridge

[57] ABSTRACT

A typewriter having a function of automatically indicating a candidate correct word for a misspelled word and, including a control device operable upon operation of a suitable key for checking entered words against data stored in a dictionary memory to find any wrong word; and if any wrong word has been found, for searching for at least one candidate correct word for the wrong word from the words stored in the dictionary memory; and for displaying the candidate correct word in relation to the wrong word. In place of, or in addition to the above function, the typewriter may have a function of automatically correcting a misspelled word, with the control device being operable upon operation of another suitable key, for activating erasing and printing mechanisms to erase at least wrong characters of the wrong word and print correct characters to correct the wrong word, according to the data representative of the wrong and correct words.

19 Claims, 4 Drawing Sheets

TYPEWRITER HAVING MEANS FOR AUTOMATIC INDICATION OF CANDIDATE CORRECT WORD FOR MISSPELLED WORD, AND/OR AUTOMATIC CORRECTION OF MISSPELLED WORD

BACKGROUND OF THE INVENTION

1. Field of the Invention

The present invention relates in general to a typewriter, and more particularly to a typewriter which has a function of automatically indicating to the operator a candidate correct word that is to be substituted for an erroneously entered word consisting of a plurality of characters, and/or which has a function of automatically correcting such an erroneously entered word.

2. Discussion of the Prior Art

There is known a type of typewriter having an input data memory for storing input data entered through a keyboard, wherein the stored input data is printed by a printing mechanism, and indicated on a display, under the control of a control device. Some of this type of typewriter have a function of informing the operator of the presence of a misspelled or wrong word after a word consisting of a plurality of characters has been entered through the keyboard. Such a wrong word is detected by comparing word data for each entered word with the corresponding word data stored in a dictionary memory incorporated in the typewriter. If the entered word is not found in the dictionary memory, that word is judged as a misspelled or wrong word.

Also known is a typewriter wherein erroneously entered or printed characters are erased upon operation of a specific erase key. When the erase key is operated, an erase ribbon is shifted to the erasing position, and the wrong characters are erased according to character data or pattern data (representative of dot-matrix patterns used in a dot-matrix printer or pen-recording apparatus) stored in an input data memory of the typewriter, which character data or pattern data correspond to the erroneously entered or printed characters.

After the wrong characters have been erased, the correct characters are entered and printed, whereby the printed wrong word is corrected.

PROBLEM SOLVED BY THE INVENTION

However, the known typewriter first described above does not have a function of indicating to the operator a correct word that may replace the detected wrong word. Therefore, if a misspelled wrong word is found, the operator must first erase the wrong word, and then key in the correct character data to correct the previously printed wrong word. This manner of correction takes a relatively long time.

In the typewriter in which printed wrong characters of a wrong word are automatically erased upon operation of an erase key, and the correct characters are printed to correct the wrong word, at least two keys must be operated, namely, the erase key and at least one character key must be depressed to correct a wrong word. This way of correction is cumbersome, and time-consuming.

SUMMARY OF THE INVENTION

It is a first object of the present invention to provide a typewriter which permits easy and fast correction of an erroneously entered word.

A second object of the invention is the provision of a typewriter which is capable of indicating a candidate correct word for an erroneously entered word.

A third object of the invention is the provision of a typewriter which permits automatic erasure of wrong characters of a stored or printed wrong word and automatic storage or printing of correct characters, to correct the wrong word, with a simple operation on the keyboard.

The first and second objects of the invention may be achieved according to the present invention, which provides a typewriter having a function of automatically indicating a candidate correct word for a misspelled word, and comprising a keyboard having a multiplicity of keys, an input data memory for storing input data entered through the keyboard, a printing mechanism operable for printing characters corresponding to the input data entered through the keyboard, a display device operable for displaying the characters, and a control device connected to the keyboard, the input data memory, the printing mechanism and the display device, for controlling the input data memory, the printing mechanism and the display device, to store, print and display the input data entered through the keyboard.

The control device includes a dictionary memory for storing data of a multiplicity of words, and spell-checking and correct-word indicating means for comparing the data of the input data with the multiplicity of words stored in the dictionary memory, to check the input data for any misspelled wrong word. If any wrong word has been found, the spell-checking and correct-word indicating means searches for at least one candidate correct word to be substituted for the wrong word, from among the words stored in the dictionary memory, and displays the candidate correct word on the display device, in relation to the wrong word.

In the typewriter of the present invention constructed as described above, if any misspelled wrong word is found, this wrong word and a candidate correct word to be substituted for the wrong word are indicated on the display device, whereby the operator is informed of the presence of the wrong word, and also informed of the candidate correct word. Thus, the instant typewriter permits the operator to easily and quickly correct misspelled words, thereby improving the typing efficiency.

According to one feature of the invention, the display device is a one-line display adapted to display the characters in one line.

According to another feature of the invention, the keyboard further has a correction key for establishing a correction mode for correcting erroneously entered words. Upon activation of the correction key, the spell-checking and correct-word indicating means is activated to search for the wrong word and the corresponding candidate correct word.

According to a further feature of the invention, the control device further includes means for activating the spell-checking and correct-word indicating means to search an already prepared text stored in the input data memory for any wrong word, and to display the corresponding candidate correct word.

Another to a still further feature of the invention, the spell-checking and correct-word indicating means activates the display device to display both the wrong word and one of at least one candidate correct word together.

According to a yet further feature of the invention, the spell-checking and correct-word indicating means activates the display device to provide an indication that the input data is being checked for any wrong word while the spell-checking and correct-word indicating means is searching for the any wrong word.

According to another feature of the invention, the spell-checking and correct-word indicating means activates the display device to provide an indication that the at least one candidate correct word is being searched for while the spell-checking and correct-word indicating means is searching for the at least one candidate correct word.

According to another feature of the invention, the keyboard further has a quit key, and the spell-checking and correct-word indicating means ceases to operate upon operation of the quit key while the spell-checking and correct-word indicating means is operating.

According to a further feature of the invention, the keyboard further has a next key, and the spell-checking and correct-word indicating means is operable for indicating on the display device a plurality of candidate correct words for each wrong word found, one after another in a predetermined order, upon successive operations of the next key.

In the above described feature of the invention, the keyboard may further have a previous key, and the spell-checking and correct-word indicating means is operable for indicating on the display device the plurality of candidate correct words in a reversed order opposite to the predetermined order, upon successive operations of the previous key.

In accordance with still another feature of the invention, the typewriter further comprises a user-dictionary memory, an add key provided on the keyboard, and dictionary-expanding means for storing as a special word any wrong word into the user-dictionary memory, upon operation of the add key after the spell-checking and correct-word indicating means has detected a wrong word. The spell-checking and correct-word indicating means is operable to search for the any wrong word by comparing the input data against the content of the user-dictionary memory, as well as the content of the dictionary memory. The spell-checking and correct-word indicating means judges the wrong word of the input data as a correct word if the wrong word coincides with a special word, after the special word has been stored in the user-dictionary memory.

In accordance with yet another feature of the invention, the typewriter further comprises an ignore key provided on the keyboard, a temporary-word dictionary memory which is cleared after the spell-checking and correct-word indicating means has completed checking of a series of the input data to search for any wrong data, and temporary-word adding means for storing as a special word a wrong word in the temporary-word dictionary memory, upon operation of the ignore key after the spell-checking and correct-word indicating means has detected the wrong word. The spell-checking and correct-word indicating means is operable to search for the any wrong word by comparing the input data against the content of the temporary-word memory, as well as the content of the dictionary memory. The spell-checking and correct-word indicating means judges a wrong word of the input data as a correct word, if the wrong word coincides with the special word, after the special word has been stored in the temporary-word dictionary.

The first and third objects of the present invention previously described may be achieved according to another aspect of the invention, which provides a typewriter having a function of automatically correcting a misspelled word, and comprising a keyboard having a multiplicity of character keys, and a correction-start key, an input data memory for storing input data entered through the keyboard, a printing mechanism operable for printing characters corresponding to the input data entered through the keyboard, an erasing mechanism operable for erasing the characters printed by the printing mechanism, a display device operable for displaying the characters entered through the keyboard, and a control device connected to the keyboard, the input data memory, the printing and erasing mechanisms and the display device, for controlling the input data memory, the printing and erasing mechanisms and the display device in accordance with the input data entered through the keyboard. The control device includes a correct-word memory for storing a correct word to be substituted for an erroneously entered wrong word. The control device further includes automatic word-correction control means operable upon operation of the correction-start key, for activating the erasing and printing mechanisms to erase at least wrong characters of the wrong word and print correct characters to correct the wrong word, according to data representative of the wrong word and data representative of the correct word.

Although it is possible to erase all characters of a wrong word and then print the characters of the correct word, this method requires a comparatively large number of characters to be erased, resulting in a comparatively long time for erasing the characters. In this sense, it is desirable to erase only the wrong characters of the wrong word, after finding those wrong characters by comparing the wrong word with the correct word.

In the typewriter constructed as described above, a single operation of the correction-start key will cause the automatic word-correction control means to activate the erasing and printing mechanism to effect automatic erasure of the wrong characters and printing of the correct characters. Thus, the correction of a misspelled wrong word can be easily and readily accomplished in a shorter length of time, whereby the printing or typing efficiency is significantly improved.

According to one feature of the above described aspect of the invention, the automatic word-correction control means comprises means for comparing the wrong word with the correct word to find at least one wrong character of the wrong word, means for moving the erasing and printing mechanisms to a position at which the at least one wrong character of the wrong word has been printed, means for activating the erasing mechanism to erase the at least one wrong character of the wrong word, and means for activating the printing mechanism to print at least one character of the correct word which corresponds to the at least one wrong character of the wrong word.

According to a further feature of the above described aspect of the invention, the keyboard further has a correction key for placing the typewriter in a correction mode for correcting a misspelled wrong word, and the previously described spell-checking and correct-word indicating means is activated upon operation of the correction key, to effect automatic searching for the wrong word and automatic indication of at least one candidate correct word which is to be printed in place of the wrong word. In this case, a single operation of the correct-start key will initiate automatic correction of the wrong word by replacing the wrong word with the indicated candidate correct word, thereby further improving the typing efficiency.

BRIEF DESCRIPTION OF THE DRAWIGNS

The above and optional objects, features and advantages of the present invention will become more apparent by reading the following detailed description of a preferred embodiment of the invention, when considered in conjunction with the accompanying drawings, in which.

DETAILED DESCRIPTION OF THE PREFERRED EMBODIMENT

Figure 1:
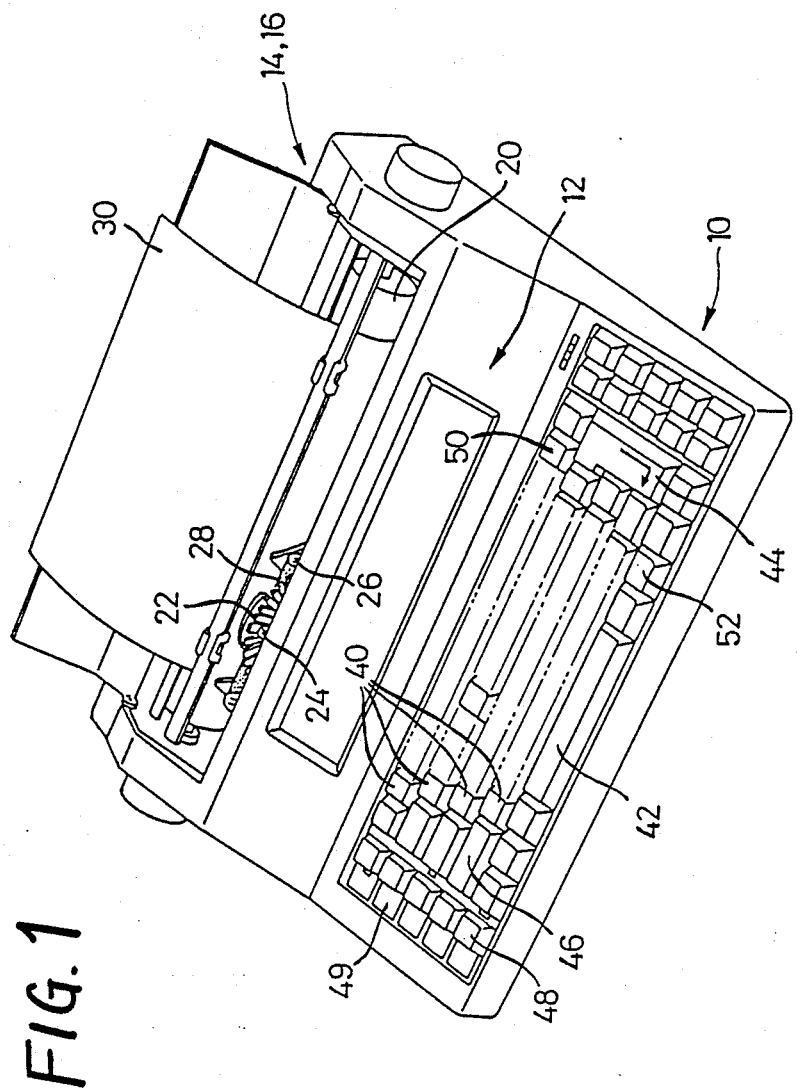
FIG. 1 is a perspective view of one embodiment of a typewriter of the present invention.

Referring to FIG. 1, there is shown an external perspective view of a typewriter embodying the concept of the present invention, which has a keyboard 10 provided at a front part thereof, a display device in the form of a liquid crystal display 12 (hereinafter referred to as "LCD display") provided at a central part thereof, and a printing mechanism 14 and an erasing mechanism 16 which are provided at a rear part thereof. The keyboard 10 has a multiplicity of keys which will be described hereinbelow.

The printing mechanism 14 includes a platen 20, a type wheel 22, a hammer 24, a print-ribbon vibrator 26, and other elements. The type wheel 22 has a multiplicity of radial arms which have type fonts at their free ends. A selected one of the type fonts is brought into a predetermined printing position aligned with the hammer 24, by rotation of the type wheel 22. With the hammer 24 operated, the selected type font is impacted against a sheet of paper 30 on the platen 20, via a print ribbon 28 whose active exposed portion has been lifted to its printing position by the print-ribbon vibrator 26. Thus, a desired character (such as a letter or symbol) corresponding to the impacted type font is printed on the paper 30. The type wheel 22, the hammer 24, the print-ribbon vibrator 26 and the other elements of the printing mechanism 14 are supported on a carriage (not shown), which is adapted to be moved in parallel with an axis of rotation of the platen 20, whereby the printing position is shifted in the direction of the width of the paper sheet 30. With the platen 20 rotated, the paper 30 is fed in a lengthwise direction perpendicular to the axis of the platen, whereby the printing position is shifted in the direction of the length of the paper.

The erasing mechanism 16 includes an erase-ribbon vibrator (not shown) that is adapted to lift an active portion of an erase ribbon to its erasing position, in the same manner as the print-ribbon vibrator 26 for lifting the print ribbon 28. This erase-ribbon vibrator cooperates with the platen 20, type wheel 22, hammer 24, and the other elements of the printing mechanism 14, to constitute the erasing mechanism 16.

The LCD display 12, which has a 40-digit capacity, is arranged for displaying a line of input data entered through the keyboard 10, and a line of each message from the typewriter to an operator of the typewriter.

The keyboard 10 has character keys 40 to enter characters such as alphabetic letters, numerals and symbols, and various function keys such as a space key 42, a CARRIAGE RETURN key 44, a SHIFT key 46, a CODE key 48, a MODE SELECT key 49, a backspace key 50 and a RELOCATE key 52. The CODE key 48 cooperates with the following character keys 40, to serve as additional function keys indicated below:

| Character Keys | Function Keys |
|---|---|
| Character key S | CORRECTION key |
| Character key Q | QUIT key |
| Character key N | NEXT key |
| Character key P | PREVIOUS key |
| Character key R | RETYPE key |
| Character key C | CHANGE key |
| Character key I | IGNORE key |
| Character key 3 | ADD key |
| Character key 2 | WORD SPELL key |
| Character key 7 | START key |

The functions of these additional fucntion keys will be described later in detail.

Figure 2:
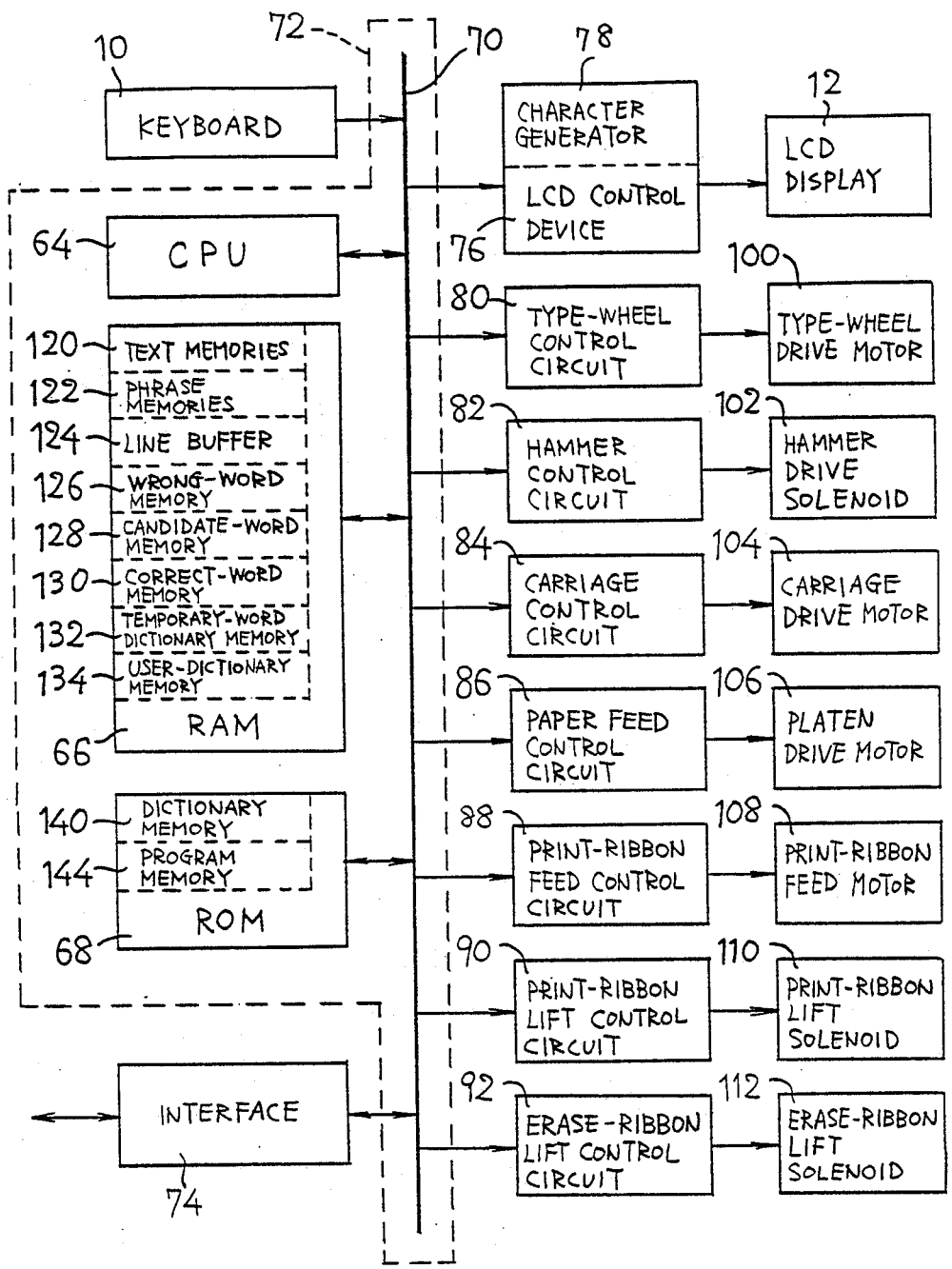
FIG. 2 is a schematic block diagram showing a control system of the typewriter of FIG. 1.

Referring next to FIG. 2, there is illustrated a control system of the present typewriter. A major part of the control system is constituted by a microcomputer 72 which incorporates a central processing unit (CPU) 64, a random-access memory (RAM) 66, a read-only memory (ROM) 68, and a bus 70. The microcomputer 72 is connected to the keyboard 10, which serves as a data input device, and also to an interface 74 which is provided to connect the typewriter to an external device such as a computer.

To the microcomputer 72, there is also connected the LDC display 12 via a LCD control device 76 which is provided with a character generator 78. In response to code data supplied from the microcomputer 72, the character generator 78 supplies the corresponding character pattern data to the LCD display 12, in order to display the corresponding characters on the LCD display 12.

The microcomputer 72 is further connected to a type-wheel drive motor 100, a hammer drive solenoid 102, a carriage drive motor 104, a platen drive motor 106, a print-ribbon feed motor 108, a print-ribbon lift solenoid 110, and an erase-ribbon lift solenoid 112, via a type-wheel control circuit 80, a hammer control circuit 82, a carriage control circuit 84, a paper feed control circuit 86, a print-ribbon feed control circuit 88, print-ribbon lift control circuit 90, and an erase-ribbon lift control circuit 92, respectively. The type-wheel drive motor 100 is operated to index the type wheel 22 to position the selected type font in the predetermined printing position aligned with the hammer 24. The hammer drive solenoid 102 is provided to activate the hammmer 24. The carriage drive motor 104 is operatively connected to the carriage through a gear train, a timing pulley, a timing belt and othertransmission members (not shown), for reciprocating the carriage right and left in the printing direction. The platen drive motor 106 is operatively connected to the platen 20 through a gear train, to rotate the platen 20 in the forward and reverse directions. The print-ribbon feed motor 108 serves as a drive source of a print-ribbon feeding mechanism for feeding the print ribbon 28 by a distance corresponding to the number of characters that have been printed. The print-ribbon lift solenoid 110 serves as a drive source for operating the print-ribbon vibrator 26 indicated above. The erase-ribbon lift solenoid 112 is used to operate the erase-ribbon vibrator for lifting the erase ribbon to the printing point. This lift solenoid 112 also functions as as drive source for feeding the erase ribbon. Described more specifically, each time the erase ribbon is lifted to the printing point by the erase-ribbon vibrator, the erase-ribbon feeding mechanism (not shown) operatively connected to the erase-ribbon vibrator is activated to increment the erase ribbon by a one-character distance. As described above, a control device for controlling the operation of the typewriter comprises the microcomputer 72, the LDC control device 76, and the various control circuits 80, 82, 84, 86, 88, 90 and 92 which have been described.

The RAM 66 includes a plurality of text memories 120, and a plurality of phrase memories 122. Each text memory 120 stores a text of a document. The text memories 120 are selected by simultaneous operations of the CODE key 48 and the character keys 40 corresponding to the respective numerals or digits. Each phrase memory 122 is provided to store a relatively short statement, i.e., a phrase. The phrase memories 122 are designated by simultaneous operations of the CODE key 48 and the character keys 40 corresponding to the respective alphabetic letters. The RAM 66 further includes a line buffer 124, a WRONG-WORD memory 126, a CANDIDATE-WORD memory 128, a CORRECT-WORD memory 130, a TEMPORARY-WORD dictionary memory 132, a USER-DICTIONARY memory 134, and other memories. The functions of these memories will be discussed.

Figure 3:
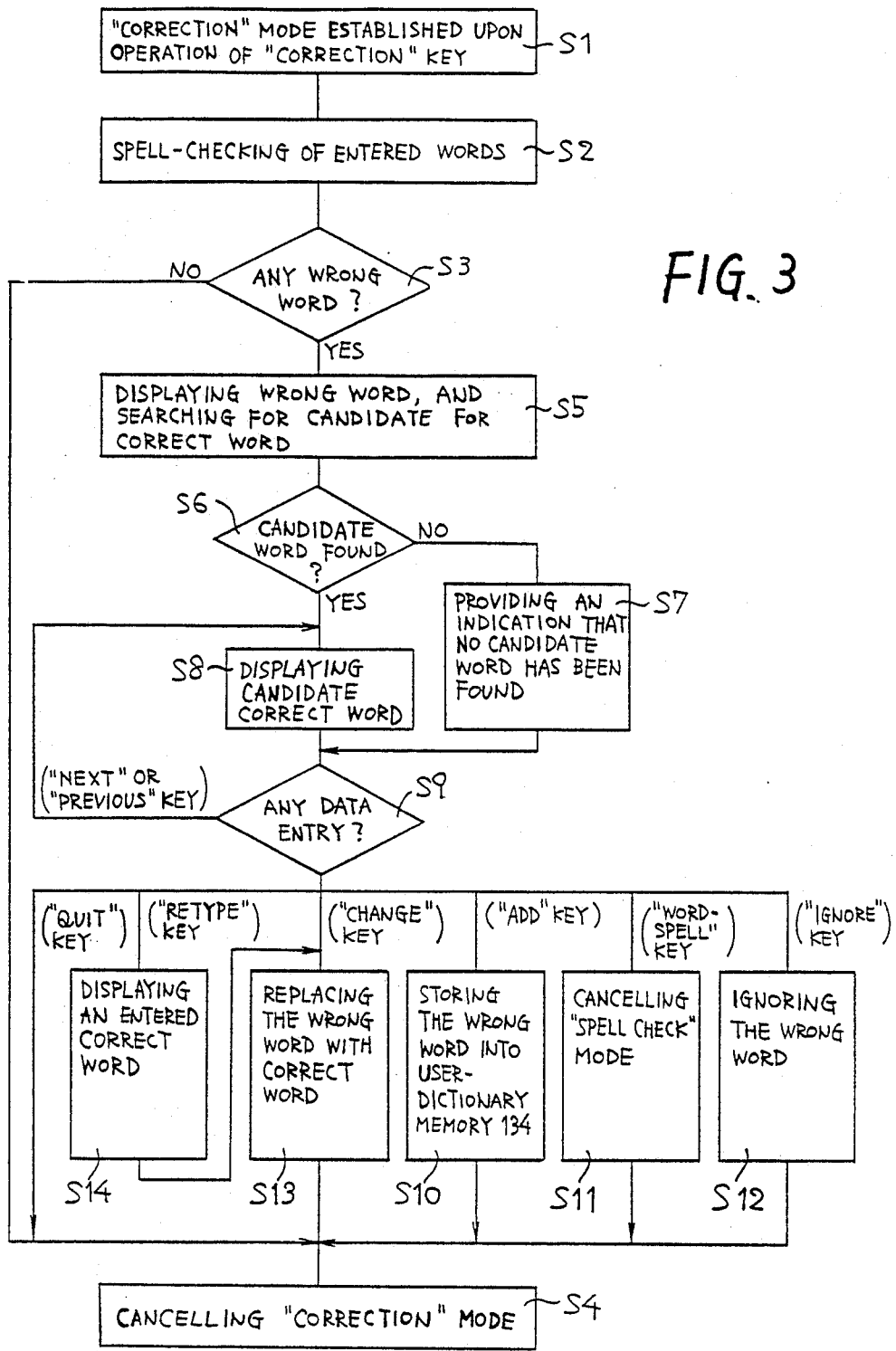
FIG. 3 is a flow chart illustrating part of a control program closely associated with the principle of the present invention.
Figure 4:
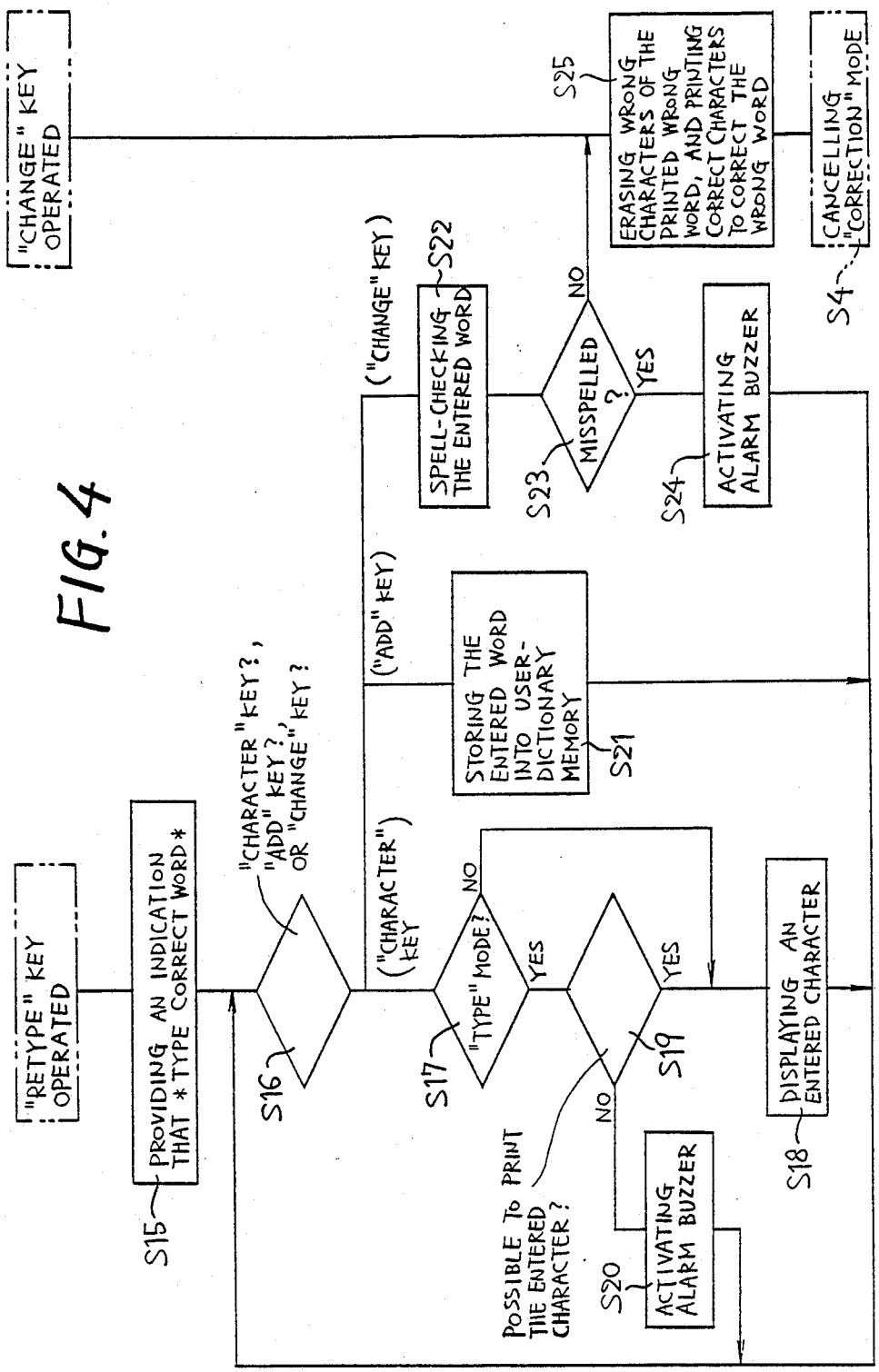
FIG. 4 is a flow chart showing details of some steps shown in the flow chart of FIG. 3.

The ROM 68 includes a DICTIONARY memory 140 storing word data representative of a multiplicity of words, and a PROGRAM memory 144 storing various control programs such as those shown in the flow charts of FIGS. 3 and 4, for controlling the operation of the typewriter.

The operation of the instant typewriter will be described. Since the normal printing, erasing and displaying operations are substantially similar to those practiced on a known typewriter, their description will be omitted, and the following description relates only to an operation associated with correcting an erroneously entered or misspelled word, referring to the flow charts of FIGS. 3 and 4.

If the CORRECTION key (40, 48) is operated after a certain length of data has been entered through the keyboard 10, the CPU 64 executes step S1 indicated in FIG. 3, wherein a CORRECTION MODE flag is set to place the typewriter in a CORRECTION mode. Step S1 is followed by step S2 to check again the entered input data for any misspelled word. More specifically, if the typewriter is placed in a SPELL CHECK mode with the WORD SPELL key held on during entry of the input data, the CPU 64 automatically checks the entered word data for misspelling of each word each time the spacekey 42 has been operated. If a misspelled word is found, the CPU 64 activates an alarm buzzer, to inform the operator of the presence of the misspelled word. On the other hand, upon operation of the CORRECTION key, all words which have been entered are one after another checked for misspelling, by comparing the entered word data with the data of the words stored in the DICTIONARY memory 140 and the USER-DICTIONARY memory 134. This spell-checking operation is accomplished, for example, by means of various algorithms disclosed in Japanese Patent Application published for opposition purposes under Publication No. 59-22270 (published in 1984). Details of the spell-checking operation are not provided herein, since the detailed description is not essential for the understanding of the principle of the present invention. It is noted that the carriage of the typewriter is held stationary during the spell-checking operation to search for misspelled wrong words. The spell checking is effected for an entire line of words which has been stored in the line buffer 124, if the typewriter is placed in a TYPE mode in which the entered data is printed without the data displayed on the LCD display 12. In a DISPLAY mode wherein the entered data is merely displayed without printing, however, the spell checking is effected for the entire text of a document which is in a process of being stored into the appropriate text memory 120. The selection of the TYPE and DISPLAY modes is carried out by the MODE SELECT key 49. In either the TYPE mode or the DISPLAY mode, the spell checking begins with the word which has been entered last, and proceeds in the direction opposite to the direction in which the words have been entered. The LCD display 12 provides an indication "CHECKING" on its left-hand side portion adjacent to the left end.

If the QUIT key (40, 48) is operated during a spell-checking operation in the DISPLAY mode, the CPU 64 ceases to perform a spell-checking operation, and cancels the CORRECTION mode, with the unchecked data being indicated on the LCD display 12 such that the word to be checked next is displayed at the right end of the display 12. However, the operation of the QUIT key in the TYPE mode will not cause the spell-checking operation to be stopped. In other words, the spell checking is continued since the checking of a single line of data may be completed in a fraction of the time required for entry of a line of data by the operator.

Step S2 is followed by step S3 to check if any misspelled wrong word has been found or not. If no wrong word has been detected, the control goes to step S4 to cancel the CORRECTION mode, whereby the typewriter is restored to the state it was in immediately before the operation of the CORRECTION key. In the event any wrong word has been found, step S3 is followed by step S5 wherein the wrong word is stored in the WRONG-WORD memory 126, and the display 12 displays the wrong word at its right end and provides an indication "SEARCHING" at its left end. Further, the CPU 64 searches for candidate correct words that may be substituted for the wrong word being displayed, from among the words stored in the DICTIONARY memory 140 and the USER-DICTIONARY memory 134. The candidate correct words for the wrong word are selected if they meet predetermined requirements, and the selected candidate correct words are stored in the CANDIDATE-WORD memory 128. The control then goes to step S6 to check if any candidate correct word has been found for the wrong word in question. If not, step S6 is followed by step S7 wherein the LCD display 12 provides a message "SUGGESTION NOT FOUND" at its left end, informing the operator of the fact that no candidate correct word has been found. If at least one candidate correct word has been found, step S6 is followed by step S8 in which the first one of the candidate correct words stored in the CANDIDATE-WORD memory 128 is stored in the CORRECT-WORD memory 130, and the candidate correct word stored in the memory 130 is displayed at the left end of the LCD display 12. Thus, the CPU 64 and the portion of the PROGRAM memory 144 corresponding to steps S1–S8, cooperate with the WRONG-WORD memory 126, the CANDIDATE-WORD memory 128, the CORRECT-WORD memory 130 and the DICTIONARY and USER-DICTIONARY memory 140, 134, to constitute spell-checking and correct-word indicating means for performing a spell-checking operation as described above, and providing an indication of at least one candidate correct word for a misspelled wrong word found in the entered data.

Step S7 or S8 is followed by step S9 wherein the CPU 64 waits for entry of any data through the keyboard 10. In this condition, any one of the following keys is effective: NEXT key; PREVIOUS key; QUIT key; RETYPE key; CHANGE key; ADD key; WORD SPELL key; and IGNORE key.

When the NEXT key is operated in step S9, the LCD display 12 displays another candidate correct word next to the currently displayed candidate. With repetitive operations of the NEXT key, all of the candidate correct words are displayed in a loop, in the predetermined order. If no next candidate correct word is present, the first candidate is displayed. When the PREVIOUS key is operated, the candidate which was displayed last is displayed again on the display 12. Similarly, all candidates are displayed successively in a loop, when the PREVIOUS key is operated repeatedly. If only one candidate correct word exists, that candidate remains displayed, even if the NEXT key or the PREVIOUS key is operated.

When the QUIT key is operated, the control goes to step S4 to cancel the CORRECTION mode, as previously described.

When the ADD key is operated, step S9 is followed by step S10 in which the detected wrong word is stored in the USER-DICTIONARY memory 134, and the CORRECTION mode is cancelled in step S4. The words stored in the USER-DICTIONARY memory 134 are handled in the same way as the words in the DICTIONARY memory 140. Stated in detail, the USER-DICTIONARY memory 134 is adapted to store such words that are frequently used by the particular user of the typewriter, but are not stored in the DICTIONARY memory 140. For example, the USER-DICTIONARY memory 134 stores proper nouns which are not found in the DICTIONARY memory 140 and would therefore be judged as wrong words. In the present embodiment, these special words registered in the USER-DICTIONARY memory 134 will not be treated as misspelled or wrong words. Thus, the CPU 64 and the portion of the PROGRAM memory 144 corresponding to step S10, serve as dictionary-expanding means for storing the currently displayed wrong word in the USER-DICTIONARY MEMORY 134 as a special word, thereby expanding the dictionary entry of the typewriter.

When the WORD SPELL key is operated, step S11 is executed to cancel the SPELL CHECK mode (to terminate the spell-checking operation). Then, the CORRECTION mode is cancelled in step S4 following step S11. If this WORD SPELL key is operated while the typewriter is not placed in the WORD SPELL mode, the WORD SPELL mode is established.

When the IGNORE key is operated, step S9 is followed by step S12 wherein the wrong word currently displayed on the LCD display 12 is stored in the TEMPORARY-WORD memory 132 of the RAM 66. After this wrong word has been stored in the TEMPORARY-WORD memory 132, this wrong word is treated in the same way as the words in the DICTIONARY memory 140 and the USER-DICTIONARY memory 134. That is, any words in the TEMPORARY-WORD memory 132 are not treated as wrong words, but rather are treated as correct words. The TEMPORARY-WORD memory 132 is cleared upon operation of the CARRIAGE RETURN key while in the TYPE mode, or when the DISPLAY MODE is cancelled. Therefore, the words stored in the TEMPORARY-WORD memory 132 are temporarily treated as correct words, that is, are effective only during one spell-checking operation. The CPU 64, and the portion of the PROGRAM memory corresponding to step S12, serve as temporary-word adding means for storing the currently displayed wrong word in the TEMPORARY-WORD memory 132 as a special word.

The CHANGE key is used when it is desired to replace the detected wrong word displayed on the LCD display 12 with the currently displayed candidate correct word. The RETYPE key is used to correct the wrong word where no candidate correct word has been found, or to replace the wrong word with a word other than the detected candidate correct word or words. The RETYPE key is also used when the sheet of paper 30 does not have sufficient space in the current line of characters for printing the currently displayed candidate correct word for the wrong word. Steps S12 and S14 which are implemented upon activation of these CHANGE and RETYPE keys are illustrated in detail in the flow chart of FIG. 4.

When the RETYPE key is activated, the CPU 64 goes to step S15 in which the LCD display 12 provides an indication "*TYPE CORRECT WORD*", prompting the operator or typist to key in a correct word that is substituted for the wrong word. Step S15 is followed by step S16 in which the CPU 64 waits for data entry through the keyboard 10. When any character key 40 has been entered in this condition, Step S16 is followed by step S17 to check if the typewriter is placed in the TYPE mode or not. If not, the control goes to step S18 to display the entered character on the LCD display 12. If the typewriter is placed in the TYPE mode, step S17 is followed by step S19 to check if it is possible to print the entered character. If the printing is possible, step S18 is executed. If the printing is not possible, however, step S19 is followed by step S20 wherein the alarm buzzer is activated, informing the operator that the printing of the entered character is not possible. For example, this alarm condition exists if there does not exist a sufficient space for the newly keyed-in word, with another word already printed immediately following the wrong word that is to be replaced by the new word, or if the carriage has reached the right margin of the paper 30.

With the above steps S16–S19, the characters of the desired correct word are entered and displayed on the display 112, one after another. Subsequently, the ADD key or CHANGE key is operated. When the ADD key is operated, step S21 is executed to store the newly entered correct word in the USER-DICTIONARY memory 134 as a special word. When the CHANGE key is operated, step S22 is executed to perform a spell-checking operation for the newly entered word. Then, step S23 is implemented to check if the entered word had been misspelled or not. If the newly entered word has been misspelled, step S23 is followed by step S24 to activate the alarm buzzer to inform the operator of the misspelling of the entered word. If not, step S23 is followed by step S25.

Step S25 is also performed when the CHANGE key is operated without previously operating the RETYPE key. Namely, when the CHANGE key is operated by the operator who wishes to replace the wrong word with the candidate correct word displayed on the display 12 in step S8 of FIG. 3, step S25 of FIG. 4 (step S13 of FIG. 3) is implemented. In step S25, the wrong word in the WRONG-WORD memory 126 is initially compared with the candidate correct word in the CORRECT-WORD memory 130, in order to find out the wrong characters of the wrong word which are different from the corresponding characters of the correct word. Then, the carriage is automatically moved to the first one of the wrong characters of the printed wrong word on the paper 30, and then the type font corresponding to the first wrong character is brought into the printing position by means of a suitable angle of rotation of the type wheel 22. Then, the erase-ribbon vibrator is activated to lift the active portion of the erase ribbon to the erase position, and the hammer 24 is activated to erase the first wrong character of the printed wrong word. Subsequently, the correct character corresponding to the erased wrong character is read out from the CORRECT-WORD memory 130, and is printed according to the read-out data, in the usual manner. With the above operations repeated, the wrong characters of the wrong word are all replaced by the correct characters, whereby the wrong word is corrected. Step S25 is followed by step S4 to cancel the CORRECTION mode, whereby the typewriter is placed in the condition it was in before the CORRECTION key was operated. Of course, the indication on the LCD display 12 is updated as the correction of the printed wrong word on the paper 30 is achieved. As is apparent from the above description, the CPU 64 and the portion of the PROGRAM memory 144 corresponding to step S25 cooperate with the type-wheel control circuit 80, hammer control circuit 82, carriage control circuit 84, print-ribbon feed control circuit 88, print-ribbon lift control circuit 90, erase-ribbon lift control circuit 92, etc., to constitute automatic word-correction control means operable upon operation of the CHANGE key, and correct-word changing means operable upon operation of the CHANGE key after operation of the RETYPE key.

While the manner of correcting a misspelled word during data entry through the keyboard 10 has been described in detail, it is possible in the DISPLAY mode to re-check the desired text or phrase which has been already stored in the text or phrase memory 120, 122.

In this case, the document or phrase to be checked for misspelling (or the corresponding text or phrase memory) is designated by the appropriate numeral or letter key 40 in combination with the CODE key. Then, the START key is operated. In response to the operation of the START key, the content of the designated text memory 120 or phrase memory 122 is sequentially displayed on the LCD display 12, starting with the beginning of the text or phrase. If the typewriter is not placed in the SPELL CHECK mode in this condition, the SPELL CHECK key is operated to establish the SPELL CHECK mode.

Subsequently, the RELOCATE key 52 is operated to call and spell-check the words of the text or phrase one at a time, from the text or phrase memory 120, 122, in the direction from the beginning to the end. As previously described, the indication "CHECKING" is provided on the LCD display 12 during this spell-checking operation, and the spell checking is interrupted by operating the QUIT key. However, when the QUIT key is operated, the LCD display 12 displays the last checked portion of the text or phrase, such that the last checked word is displayed at the right end of the display 12.

In the case where a misspelled wrong word has been found, the checked portion of the text or phrase is displayed such that the wrong word is located at the right end of the LCD display 12. Further, the typewriter is restored to a data entry state ready for entering data through the keyboard 10. In this state, the wrong word may be corrected by first operating the CORRECTION key, in the same manner as previously discussed. When the RELOCATE key 52 is operated again after the completion of the correction of the wrong word, the spell-checking operation is resumed. With the above operation repeated, the entire text or phrase in the selected text or phrase memory 120, 122 may be check for misspelled words. After the spell-checking operation is completed, the last word is displayed at the right end of the LCD display 12, and the typewriter is restored to the data entry state. Thus, the CPU 64 and the PROGRAM memory 144 cooperate with the character key 40, CODE key 48 and RELOCATE key 52, to constitute means for activating the spell-checking and correct-word indicating means to check an already prepared text stored in the text memories 120 or phrase memories 122.

It will be understood from the foregoing description that the CHANGE key, i.e., the CODE key 48 and the character key 40 corresponding to character "C", serve as a correction-start key for initiating correction of a wrong word, while the CORRECTION key, i.e., the CODE key 48 and the character key corresponding character "S", serve as a key for establishing the CORRECTION mode. Further, the NEXT key, i.e., the CODE key 48 and the character key 40 corresponding to character "N", and the PREVIOUS key, i.e., the CODE key 48 and the character key 40 corresponding to character "P", serve as keys for calling candidate correct words for a wrong word. The text memories 120, phrase memories 122, or the line buffer 124 serve as an input data memory for storing data entered through the keyboard 10.

In the illustrated embodiment of the invention, the wrong characters of a wrong word are detected by comparing the data of the wrong word in the WRONG-WORD memory 126 with the wrong data of the correct word in the CORRECT-WORD memory 130. However, it is possible to compare the wrong word in the input data memory in the form of the text memory 120, phrase memory 122 or line buffer 124, with the correct word in the CORRECT-WORD memory 130.

In the illustrated embodiment, a wrong word and a candidate correct word are displayed together on the LCD display 12 to indicate the wrong word in relation to the candidate correct word. It is possible for the wrong word and the candidate correct words to be displayed alternately, each for a predetermined time, at the same position on the display 12. In essence, the candidate correct word may be displayed in any suitable manner, provided that the operator may recognize that the displayed candidate correct word is a candidate for the particular wrong word. Further, it is possible that if a wrong word is found during data entry in the SPELL CHECK mode, a candidate correct word for the detected wrong word is indicated at a position a suitable distance away from the position at which the wrong word is indicated. In this case, it is preferred that one of the wrong word and its candidate correct word is displayed in a special manner, for example, with a higher degree of luminance or in a flickering manner.

Although the illustrated embodiment is adapted to correct a wrong word by first erasing each wrong character of a wrong word before the corresponding correct character is printed, it is possible to first erase all of the wrong characters of the wrong word successively and then print the corresponding correct characters.

While the present invention has been described in its preferred embodiment, it is to be understood that the invention may be embodied with various other changes, modifications and improvements in connection with the keyboard, input data memories, printing and erasing mechanisms, display, control device, and control programs, which may occur to those skilled in the art, in the light of the foregoing teachings.

What is claimed is:

1. A typewriter having a function of automatically indicating a candidate correct word for a mispelled word, comprising:
    a keyboard having a multiplicity of keys;
    an input data memory for storing input data constituting words entered through said keyboard;
    a printing mechanism operable for printing characters corresponding to said input data entered through said keyboard;
    a display device operable for displaying said characters in only one line; and
    a control device connected to said keyboard, said input data memory, said printing mechanism and said display device, for controlling said input data memory, said printing mechanism and said display device, to store, print and display said input data entered through said keyboard;
    said control device including a dictionary memory for storing data of a multiplicity of words, and spell-checking and correct-word indicating means for sequentially comparing each of the words of said input data with said multiplicity of words stored in said dictionary memory, to check said input data for any misspelled wrong words, and if a wrong word is found in said input data, searching for at least one candidate correct word to be substituted for said found wrong word, from among said words stored in said dictionary memory, displaying said wrong word, and upon locating said candidate correct word displaying said candidate correct word in relation to said found wrong word on said display device, without operator intervention upon location of a candidate correct word.

2. A typewriter according to claim 1, wherein said spell-checking and correct-word indicating means activates said display defice to provide an indication that the input data is being checked for any wrong word, while said spell-checking and correct-word indicating means is searching for said any wrong word.

3. A typewriter according to claim 1, wherein said spell-checking and correct-word indicating means activates said display device to provide an indication that said at least one candidate correct word is being searched for, while said spell-checking and correct-word indicating means is searching for said at least one candidate correct word.

4. A typewriter according to claim 1, wherein said keyboard further has a quit key, and said spell-checking and correct-word indicating means ceases to operate upon operation of said quit key while said spell-checking and correct-word indicating means is operating.

5. A typewriter according to claim 1, wherein said keyboard further has a next key, and said spell-checking and correct-word indicating means is operable for indicating on said display device a plurality of candidate correct words for each wrong word found, one after another in a predetermined order, upon successive operations of said next key.

6. A typewriter according to claim 5, wherein said keyboard further has a previous key, and said spell-checking and correct-word indicating means is operable for indicating on said display device said plurality of candidate correct words in a reversed order opposite to said predetermined order, upon successive operations of said previous key.

7. A typewriter according to claim 1, further comprising:
    a user-dictionary memory;
    an add key provided on said keyboard; and
    dictionary-expanding means for storing as a special word said found wrong word in said user-dictionary memory, upon operation of said add key after said spell-checking and correct-word indicating means has found said found wrong word,
    said spell-checking and correct-word indicating means being operable to search for said any misspelled wrong words by comparing said input data against the content of said user-dictionary memory, as well as the content of said dictionary memory, said spell-checking and correct-word indicating means judging a word of said input data which coincides with said special word.

8. A typewriter according to claim 1, further comprising:
    an ignore key provided on said keyboard;
    a temporary-word dictionary memory which is cleared after said spell-checking and correct-word indicating means has completed checking of said words of said input data to search for said any wrong words; and
    temporary-word adding means for storing as a special word said found wrong word in said temporary-word dictionary memory, upon operation of said ignore key after said spell-checking and correct-word indicating means has found said found wrong word,
    said spell-checking and correct-word indicating means being operable to search for said any misspelled wrong words by comparing said input data against the content of said temporary-word memory, as well as the content of said dictionary memory, said spell-checking and correct-word indicating means judging a word of said input data which coincides with said special word as a correct word.

9. A typewriter according to claim 1, wherein said display device displays said candidate correct word and said found wrong word in juxtaposed relation with said found wrong word at a first one of opposite ends of said display device, and said candidate correct word at a second one of opposite ends thereof.

10. A typewriter according to claim 1, wherein said display device displays said found wrong word and said candidate correct word in alternating relation at the same position on the display device.

11. A typewriter having a function of automatically correcting an erroneously entered wrong word, comprising:
   a keyboard having a multiplicity of character keys, and a correction-start key;
   an input data memory for storing input data constituting words entered through said keyboard;
   a printing mechanism operable for printing characters corresponding to said input data entered through said keyboard;
   an erasing mechanism operable for erasing said characters printed by said printing mechanism;
   a display device operable for displaying said characters entered through said keyboard; and
   a control device connected to said keyboard, said input data memory, said printing and erasing mechanisms and said display device, for controlling said input data memory, said printing and erasing mechanisms and said display device, according to said input data entered through said keyboard;
   said control device including a correct-word memory for storing a correct word to be substituted for an erroneously entered wrong word, and further including automatic word-correction control means operable upon operation of said correction-start key, for comparing said wrong word with said correct word to find wrong characters of said wrong word which are different from corresponding characters of said correct word, and activating said erasing and printing mechanisms to erase only at said wrong characters of said wrong word, and then print correct characters to correct said wrong word, according to data representative of said wrong word and data representative of said correct word.

12. A typewriter according to claim 11, wherein said control device includes a dictionary memory for storing data of a multiplicity of words, and spell-checking means for comparing each word of said input data; and wherein said correct word consists of a candidate word which is searched for by said control device from among said words stored in said dictionary memory.

13. A typewriter according to claim 11, wherein said correct word consists of a word re-entered through said keyboard.

14. A typewriter having a function of correcting a misspelled word, comprising:
   a keyboard having a multiplicity of character keys, a correction key for placing the typewriter in a correction mode for correcting a misspelled wrong word, and a change key for starting correction of said wrong word;
   an input data memory for storing input data constituting words entered through said keyboard;
   a printing mechanism operable for printing characters corresponding to said input data entered through said keyboard;
   an erasing mechanism operable for erasing said characters printed by said printing mechanism; and
   a control device connected to said keyboard, said input data memory, and said printing and erasing mechanisms, for controlling said input data memory, and said printing and erasing mechanisms, according to said input data entered through said keyboard;
   said control device including (a) a dictionary memory for storing data of a multiplicity of words, (b) spell-checking means operable upon operation of said correction key, for comparing each of the words of said input data with said multiplicity of words stored in said dictionary memory, to check said input data for any misspelled wrong words, (c) a correct-word memory for storing characters of a correct word to be substituted for a wrong word detected by said spell-checking means, (d) automatic word-correction control means operable upon operation of said change key, for activating said erasing and printing mechanisms to erase said detected wrong word and print in its place said correct word, according to data representative of said detected wrong word and said correct word stored in said correct-word memory, (e) judging means operable, after said correct word is stored in said correct-word memory, for determining whether there exists a sufficient space for printing said correct word in place of said detected wrong word, and (f) alarm means which is activated if said judging means determines that said sufficient space does not exist.

15. A typewriter according to claim 14, wherein said judging means determines whether the number of said characters of said correct word exceeds the number of characters of said detected wrong word, and said alarm means is activated if said number of characters of said correct word exceeds said number of characters of said detected wrong word.

16. A typewriter according to claim 14, wherein said keyboard further has a retype key, and said correct word stored in said correct-word memory consists of a re-entered word which is entered through said character keys after said retype key is operated after said detected wrong word has been detected by said spell-checking means.

17. A typewriter according to claim 16, further comprising a display device for displaying characters entered through said character keys, said alarm means being activated while the characters of said re-entered word which has been entered are displayed on said display device, and before said re-entered and displayed characters are printed.

18. A typewriter comprising:
   a keyboard having a multiplicity of keys including an ignore key;
   an input data memory for storing input data constituting words entered through said keyboard;
   a printing mechanism operable for printing characters corresponding to said input data entered through said keyboard;
   a control device connected to said keyboard, said input data memory and said printing mechanism, for controlling said input data memory and said printing mechanism, to store and print said input data entered through said keyboard;
   said conrol device including a dictionary memory for storing data of a multiplicity of words, and spell-checking and correct-word indicating means for comparing each of the words of said input data with said multiplicity of words stored in said dictionary memory, to detect any wrong words which are misspelled within said input data, and indicating the detection of any said wrong words;
   a temporary-word dictionary memory which is cleared after said spell-checking and correct-word indicating means has completed checking of said words of said input data to search for said any wrong words; and temporary-word adding means for storing as a special word each word detected as a wrong word by said spell-checking and correct-word indicating means in said temporary-word dictionary memory, upon operation of said ignore key after said spell-checking and correct-word indicating means has detected a first occurrence of the word, said spell-checking and correct-word indicating means being operable to search for said any misspelled wrong words, by comparing each of said input data against the content of said temporary-word dictionary memory, as well as the content of said dictionary memory, said spell-checking and correct-word indicating means ignoring the first occurrence of each word constituting a special word and judging subsequent occurrences of each word constituting the special word as a correct word, said typewriter further comprising an add key provided on said keyboard, a user-dictionary memory which is not cleared after said spell-checking and correct-word indicating means has completed checking of said words of input data, and dictionary-expanding means for storing also as a special word said each word detected as a wrong word into said user-dictionary memory, upon operation of said add key after said spell-checking and correct-word indicating means has detected the word, said spell-checking and correct-word indicating means being operable to search for said any misspelled wrong words, by comparing said input data against the content of said user-dictionary memory, as well as the contents of said dictionary memory and said temporary-word dictionary memory, said spell-checking and correct-word indicating means judging each word of said input data which coincides with a special word stored in said user-dictionary memory as a correct word.

19. A typewriter according to claim 18, wherein said control device searches for at least one candidate correct word to be substituted for each one of said detected wrong words not constituting a special word from among said words stored in said dictionary memory, before checking said input data for another misspelled word, said typewriter further comprising a display device operable for displaying the characters entered through said keyboard, said spell-checking and correct-word indicating means causing said display device to display said candidate correct word in relation to said detected wrong word not constituting a special word.

* * * * *